Patented Mar. 19, 1935

1,994,503

UNITED STATES PATENT OFFICE

1,994,503

COMPOSITION OF RUBBER-LIKE MATERIAL AND METHOD OF MAKING GOODS THEREFROM

Wilfred Henry Chapman, Stechford, Birmingham, Donald Whitworth Pounder, Moseley, Birmingham, Edward Arthur Murphy, Erdington, Birmingham, and Frank Theodore Purkis, Moseley, Birmingham, England, assignors to Dunlop Rubber Company Limited, London, England, a British company No Drawing. Application March 24, 1933, Serial No. 662,576. In Great Britain December 7, 1928

15 Claims. (Cl. 18—50)

This invention comprises improvements in or relating to the manufacture of goods of rubber or similar material from aqueous dispersions thereof of the kinds hereinafter specified and which is made capable of gelling under selected time and temperature conditions by having admixed therein predetermined quantities of one or more of the salts of hydrofluosilicic acid or of the free hydrofluosilicic acid itself if the aqueous dispersion or emulsion of rubber or similar material has already admixed therein a free base such as ammonia or other alkalies or alkaline reacting materials.

The present application is a continuation in part of our co-pending application Serial No. 406,982, filed November 13, 1929.

The object of this invention is to manufacture goods of rubber or similar material direct from aqueous emulsions or dispersions thereof having variable quantities of one or more of the salts of hydrofluosilicic acid admixed therein, under such conditions as to increase the viscosity of the aqueous dispersions and/or rendering the aqueous emulsion or dispersion capable of gelling in the cold or by the application of heat in definite and controllable time intervals and without danger of clot formation.

According to the present invention it has been found that the salts of hydrofluosilicic acid have a variable effect upon any particular aqueous dispersion or emulsion of rubber or similar material according to the quantity of the salts added and to the presence of alkalies or other preservatives.

Silicofluoric acid and its salts have heretofore been used to coagulate and separate rubber from latex. It accomplishes this coagulation and separation by formation of clots of coagulated rubber which may be then separated from the liquid syrup. The formation of such clots where a gel is required is, however, very disadvantageous and generally destructive of the usefulness of the material when a gel and not a coagulum is desired.

In the present invention, however, hydrofluosilicic acid and its salts, such as sodium, potassium, barium, ammonium and other salts, may be added to a latex, either concentrated or dilute or compounded or uncompounded, without danger of clot formation by having in the latex, or other dispersion, a suitable quantity of a preservative. This preservative may be ammonia, which is most commonly used, or it may be an equivalent amount of sodium hydroxide or potassium hydroxide, or other alkali hydroxide, or salts of alkalies with weak acids which give an alkaline reaction by hydrolysis or other reactions. Hydrofluosilicic acid may be used when there is a sufficient quantity of the alkali present to form salts with all or a part of the acid. Excess of alkalinity must be avoided. The pH value in the resulting mixture should not be more than 11.

The amount of hydrofluosilicic acid or of its salts may be varied within certain limits to vary the time within which, or the temperature at which, the latex will gel. When less than the minimum quantity of the hydrofluosilicic acid or of its salts is added, a thickening of the dispersion or latex may take place without setting to a gel. Quantities immediately above this minimum are found to be insufficient to bring about rapid gelling in the cold, but allow the salts present to become active gelling agents upon the application of heat.

It is found that where a latex concentrate is used having an 0.5% ammonia and 60% rubber content obtained by a centrifugal concentration process, 0.1% to 1.0% of sodium silicofluoride on the rubber is sufficient to bring about gelling at about 80° C. The stability of the latex concentrate and the rapidity of gelling required are factors of importance. Below the minimum quantity mentioned, it is found that these salts of hydrofluosilicic acid are not able to gel within a reasonable time either in the cold or when heated, but quantities below the minimum mentioned, within the order of 0.05%–0.1% on the rubber content are able to increase the viscosity of such aqueous emulsions or dispersions of rubber.

With the use of increased quantities in the order of 1% to 5% on the rubber, of these salts it has been found according to the invention that aqueous emulsions or dispersions of rubber or similar material are able to gel uniformly in the cold.

During the addition of these salts no serious local coagulation occurs. The total time within which gelling can be completed can be reduced to as low as five minutes and possibly lower, if required. The time before gelling commences is also controllable. It has also been found that zinc oxide, among other substances, is an activator of the gelling process and that rapid gelling in the cold occurs when the alkalinity is low. The salts may be added either as a powder which is sieved into the latex, or as a dispersion, usually in water, with or without the addition of suitable dispersing agents or protective colloids.

The emulsions or dispersions comprise by way of example, those consisting of or containing rubber, gutta-percha, balata or similar vegetable resins occurring naturally, or artificially obtained, and in vulcanized or unvulcanized condition. Aqueous dispersions of coagulated rubber, vulcanized rubber, waste or reclaim may also be employed, if desired, as alternatives or admixtures. Any of the aforesaid dispersions may contain the usual known compounding ingredients and/or may be in concentrated form. Concentrates such as are obtained in Patent No. 1,846,164, Feb. 23, 1932, may be used.

An example of a latex mixing is as follows:— Latex concentrated to 60% rubber content by centrifugal action preserved with approximately 0.5% ammonia is compounded to give the following composition—

| | Parts by weight |
|---|---|
| Rubber | 100 |
| Sulphur | 5 |
| Mineral oil | 10 |

The ammonia content of the mixing is reduced by known means to 0.05%. Other preservatives, such as sodium hydroxide, potassium hydroxides, or other alkali hydroxides or alkaline salts of weak acids, such as weak organic fatty acids or of other organic compounds, may be used in quantity equivalent to 0.05% ammonia.

When the above latex mixing is required for use as a heat sensitive mixing, 2 grams of sodium silicofluoride are carefully stirred in as a suspension in 4 ccs. of water to each litre of the latex mixing, i. e., 0.33 grams of sodium silicofluoride per 100 grams of rubber. Should it, however, be required only to increase the viscosity of the above mixing, it has been found that the addition of 0.05 to 0.2 part per 100 parts of rubber contained in the concentrated latex is sufficient to increase the viscosity to a considerable degree, so yielding a product particularly suitable for spreading and dipping. Where, on the other hand, the above latex mixing is required to be used as one capable of gelling in the cold, it has been found that the addition of 1.3 parts of sodium silicofluoride per 100 parts of rubber is sufficient for the latex mixing to set to a firm homogeneous gel in approximately 15 minutes if allowed to stand at atmospheric temperature.

An example of use of a latex preserved with caustic potash is as follows:— Latex concentrated to 60% rubber content by centrifugal action preserved with ammonia is blown down so as to remove the ammonia present. 0.2% caustic potash on the rubber content is then added. When to this latex preserved with caustic potash 0.5% of sodium silicofluoride is added gelling takes place in the cold in twelve hours.

Naturally it is to be understood that according to the source and kind of aqueous dispersion employed, it may be necessary to carry out a series of tests prior to gelling or increasing of the viscosity so as to obtain the most satisfactory quantities of the salts of hydrofluosilicic acid required.

The term "gelling" is meant to signify the change of state of the rubber or the like material in the aqueous dispersion from the dispersed state to the state wherein the rubber forms the continuous phase. The whole of the dispersion medium is included in the pores, capillaries or cells of microscopic or ultra-microscopic dimensions of the structure of the solid produced. The gel so formed is a strong homogeneous irreversible solid structure without pores visible to the naked eye. The microscopic or ultramicroscopic pores, capillaries or cells which contain the serum gradually become smaller or completely disappear on drying of the gel.

The salts of hydrofluosilicic acid can be easily introduced into the aforesaid dispersions, clot formations being readily prevented and the use of these salts in this connection also permits the easy predetermination of a definite time interval before gelling is to take place in the cold probably because of the nature of the complex interactions taking place in the aforesaid dispersions. Consequently this class of coagulant has advantages for mass molding or the like operations far above those of the general group of so called coagulants.

The gelling action can take place with latices or dispersions of different concentrations, but may be accomplished with latex containing a normal amount of rubber content and with latices which have been concentrated, though it is preferable to employ a concentrated latex. Usually it is desirable only to employ a small quantity of ammonia when ammonia is used or is present. The usual ammoniated latices of commerce, and containing up to 1% concentration, are generally suitable.

What we claim is—

1. In the manufacture of goods from alkaline aqueous dispersions of rubber or similar materials the method which includes the step of reacting said alkaline dispersions in quantity sufficient to gel said dispersion, with a salt hydrofluosilicic acid the pH value of the resulting mixture being not over 11.

2. In the manufacture of goods from alkaline aqueous dispersions of rubber or similar materials the method which includes the step of reacting on said alkaline dispersions with a salt of hydrofluosilicic acid in proportion ranging from about 0.05 to 5 per cent of the dispersed material to control the degree and speed of thickening and gelling of said dispersion.

3. The process defined in claim 1 wherein the dispersions are rendered capable of gelling on heating by the addition of salts of hydrofluosilicic acid in excess of a predetermined minimum quantity for a particular composition of the dispersion, said minimum being not materially less than about one tenth of one per cent of the content of dispersed material.

4. The method of claim 1 wherein the capability of the dispersion to gel on heating is aided by the introduction of zinc oxide.

5. A new composition of matter adapted for use in the production of rubber goods by operations such as spreading, dipping, impregnating, spraying, molding, extrusion, or electrophoresis, which comprises an alkaline aqueous emulsion or dispersion of rubber or similar material having admixed therewith a salt of hydrofluosilicic acid in quantity sufficient to gel said dispersion.

6. In the manufacture of goods from aqueous dispersions of rubber material the method which comprises reacting on a dispersion containing rubber and having a small quantity of ammonia with a salt of hydrofluosilicic acid in quantity not less than 0.05 parts per hundred parts of rubber.

7. The method of manufacturing goods from aqueous dispersions of rubber which comprises reacting on a slightly alkaline preserved latex containing approximately 60 per cent or more of dispersed rubber content with a salt of hydrofluosilicic acid, said salt equalling from 0.33 parts by weight of the salt per one hundred parts by weight of rubber to 1.3 parts of the salt to one hundred parts by weight of rubber.

8. The method of gelling rubber latex which comprises reacting on a slightly alkaline dispersion of rubber material containing approximately 60 per cent or more of dispersed material with a sodium silicofluoride in the proportion of from 0.33 to 1.3 parts by weight of the silicofluoride to one hundred parts by weight of the dispersion, and heating said dispersion.

9. A composition of matter comprising a concentrated slightly alkaline aqueous dispersion of rubber material and a salt of hydrofluosilicic acid, the proportion of said salt to said dispersion being above about one tenth of one per cent.

10. A composition of matter comprising a concentrated slightly alkaline aqueous dispersion of rubber material and a salt of hydrofluosilicic acid, the proportion of said salt to said dispersion being in the proportion of between one tenth of one per cent and 1.3 per cent.

11. A method of gelling aqueous dispersions of rubber material which comprises treating said dispersion in a slightly alkaline medium with a salt of hydrofluosilicic acid.

12. A method of gelling an aqueous dispersion of rubber which comprises treating a slightly alkaline latex with a salt of hydrofluosilicic acid.

13. A method of gelling aqueous dispersions of rubber material which comprises forming a salt of hydrofluosilicic acid in an alkaline aqueous dispersion of rubber material.

14. The method of claim 1 in which the dispersions are reacted with the salt of hydrofluosilicic acid by adding to said dispersions a slightly soluble salt of the group comprising hydrofluosilicates of the alkaline earths and alkalies including ammonium.

15. The method of claim 1 in which the alkaline dispersions are reacted with the salt of hydrofluosilicic acid by adding to said dispersions hydrofluosilicic acid.

WILFRED HENRY CHAPMAN.
DONALD WHITWORTH POUNDER.
EDWARD ARTHUR MURPHY.
FRANK THEODORE PURKIS.